US011932555B2

(12) United States Patent
Takatori et al.

(10) Patent No.: US 11,932,555 B2
(45) Date of Patent: Mar. 19, 2024

(54) WATER TREATMENT MANAGEMENT APPARATUS AND WATER QUALITY MONITORING METHOD

(71) Applicant: ORGANO CORPORATION, Tokyo (JP)

(72) Inventors: Nozomi Takatori, Tokyo (JP); Hiroshi Sugawara, Tokyo (JP); Kazushige Takahashi, Tokyo (JP); Fumio Sudo, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 28 days.

(21) Appl. No.: 16/979,421

(22) PCT Filed: Feb. 14, 2019

(86) PCT No.: PCT/JP2019/005264
§ 371 (c)(1),
(2) Date: Sep. 9, 2020

(87) PCT Pub. No.: WO2019/176435
PCT Pub. Date: Sep. 19, 2019

(65) Prior Publication Data
US 2021/0078873 A1    Mar. 18, 2021

(30) Foreign Application Priority Data

Mar. 13, 2018 (JP) ................. 2018-045512

(51) Int. Cl.
| | |
|---|---|
| C02F 1/00 | (2023.01) |
| B01D 61/02 | (2006.01) |
| B01D 61/08 | (2006.01) |
| B01D 61/12 | (2006.01) |
| C02F 1/32 | (2023.01) |

(Continued)

(52) U.S. Cl.
CPC ............ *C02F 1/008* (2013.01); *B01D 61/025* (2013.01); *B01D 61/08* (2013.01); *B01D 61/12* (2013.01);
(Continued)

(58) Field of Classification Search
CPC .. C02F 1/008; C02F 1/32; C02F 1/441; C02F 1/20; C02F 1/283; C02F 1/42;
(Continued)

(56) References Cited

FOREIGN PATENT DOCUMENTS

| | | | | |
|---|---|---|---|---|
| CN | 201362623 Y | * | 12/2009 | ................ C02F 1/42 |
| CN | 102348644 A | | 2/2012 | |

(Continued)

OTHER PUBLICATIONS

CN 201362623 Y English description, Dec. 2009, Xiaoqiang Tang.*
(Continued)

*Primary Examiner* — Akash K Varma
(74) *Attorney, Agent, or Firm* — Greenblum & Bernstein, P.L.C.

(57) ABSTRACT

A water treatment management apparatus used for monitoring and evaluating water supplied to a water treatment system such as an ultrapure water production system and performing appropriate management of operation of the water treatment system includes: a pure water production unit for evaluation to which water to be supplied to the water treatment system is supplied as target water, the pure water production unit for evaluation including a TOC removal apparatus for performing a unit operation of removing total organic carbon (TOC) components; and measuring means for measuring TOC concentration at a plurality of measurement points in the pure water production unit for evaluation, the plurality of the measurement points including an inlet and an outlet of the pure water production unit for evaluation.

13 Claims, 3 Drawing Sheets

(51) Int. Cl.
  *C02F 1/44* (2023.01)
  *C02F 101/34* (2006.01)
  *C02F 101/38* (2006.01)
  *C02F 103/04* (2006.01)
(52) U.S. Cl.
  CPC .............. *C02F 1/32* (2013.01); *C02F 1/441* (2013.01); *B01D 2311/246* (2013.01); *C02F 2101/34* (2013.01); *C02F 2101/38* (2013.01); *C02F 2103/04* (2013.01); *C02F 2209/20* (2013.01)
(58) Field of Classification Search
  CPC .. C02F 1/444; C02F 1/325; C02F 1/44; C02F 1/00; C02F 1/28; C02F 1/46; C02F 1/58; C02F 9/00; C02F 9/08; C02F 9/02; C02F 2101/34; C02F 2101/38; C02F 2103/04; C02F 2209/20; B01D 61/025; B01D 61/12; B01D 61/08; B01D 61/02; B01D 2311/246; B01D 2311/06; B01D 2311/2619
  USPC ........................................................ 210/652
  See application file for complete search history.

(56) References Cited

FOREIGN PATENT DOCUMENTS

| CN | 107001075 A | | 8/2017 | |
|----|----|----|----|----|
| CN | 107010736 A | | 8/2017 | |
| CN | 107188352 A | | 9/2017 | |
| JP | 1998085740 A | | 4/1998 | |
| JP | 2002-292378 A | | 10/2002 | |
| JP | 2004-167308 | | 6/2004 | |
| JP | 2010-99545 A | | 5/2010 | |
| JP | 2013-220393 A | | 10/2013 | |
| JP | 2016-107249 A | | 6/2016 | |
| JP | 2016107249 A | * | 6/2016 | ............. B01D 61/08 |
| KR | 10-2005-0099878 | | 10/2005 | |
| KR | 10-2013-0114616 | | 10/2013 | |

OTHER PUBLICATIONS

JP 2016107249 A English description, Jun. 2016, Noguchi Yukio et al.*
Office Action issued in corresponding Taiwanese Patent Application No. 108108358 dated Dec. 23, 2021, along with English translation thereof.
Office Action issued in the corresponding Chinese Patent Application No. 201980018499.X dated Jan. 27, 2022, along with English translation thereof.
International Search Report issued in International Pat. Appl. No. PCT/JP2019/005264, dated Apr. 9, 2019, along with an English translation thereof.
Office Action issued in Corresponding Korean Patent Application No. 10-2023-7023622, dated Nov. 28, 2023, along with an English translation thereof.

* cited by examiner

WATER TREATMENT MANAGEMENT APPARATUS AND WATER QUALITY MONITORING METHOD

TECHNICAL FIELD

The present invention relates to a water treatment management apparatus and a water quality monitoring method used in performing water treatment such as ultrapure water production.

BACKGROUND ART

For example, in a water treatment system such as an ultrapure water production system which produces ultrapure water raw water, it is necessary to pay attention to water quality of the raw water supplied to the water treatment system. In an ultrapure water production system, for example, a reverse osmosis membrane (RO) treatment or an ultraviolet (UV) oxidation treatment is performed in order to remove organic substances, i.e., total organic carbon (TOC) components, contained in raw water. However, in the organic substance components, there are components which are easy to be removed by these treatments and components which are not.

As raw water supplied to an ultrapure water production system, tap water, clean water, industrial water, and the like have been used until now. Recently, reclaimed water and recovered water which are reused water by performing primary treatment of factory wastewater, etc. have been used as the raw water in order to effectively utilize water resources. Unlike industrial water, water quality of reclaimed water and recovered water may not be stable, and reclaimed water and recovered water may suddenly contain unexpected organic substances. If organic substances that are difficult to remove are mixed into the raw water, they may affect water quality of treated water at the outlet of the ultrapure water production system. Therefore, it has become more important to monitor the water quality of raw water in an ultrapure water production system and appropriately manage the operation of the ultrapure water production system according to the water quality. In the following description, an organic species which is difficult to be removed by an ultrapure water production system is referred to as a hardly-decomposable TOC component.

Patent Literature 1 discloses a matter, as an ultrapure water production system which monitors water quality of raw water, that a main ultrapure water production system for producing ultrapure water supplied to a point of use and an auxiliary ultrapure water production system for monitoring the water quality of the raw water to perform control are provided. The auxiliary ultrapure water production system produces ultrapure water of equivalent water quality to the main ultrapure water production system and has an equivalent configuration to the main ultrapure water production system, but is configured and operated so as to have a shorter residence time than the main ultrapure water production system. The residence time is the time required for the raw water supplied to an inlet of a system to be purified and to flow out of an outlet of the system. Then, in the system of Patent Literature 1, TOC concentration of the ultrapure water obtained from the auxiliary ultrapure water production system is measured, and the water quality of raw water is evaluated based on this TOC concentration, and the raw water supply amount and the like supplied to the main ultrapure water production system is controlled.

However, in the system described in Patent Literature 1, since the main ultrapure water production system and the auxiliary ultrapure water production system are configured to be equivalent to each other and produce ultrapure water of equivalent water quality, a large installation space is required due to an increase in equipment scale, and also an initial cost and an operation cost are increased. Further, since they have an equivalent configuration as described above, it is not possible to remarkably shorten the residence time in the auxiliary ultrapure water production system compared with the main ultrapure water production system, and as a result, it becomes impossible to cope with a rapid change in water quality in the raw water, which makes it difficult to manage the operation of the ultrapure water production system.

CITATION LIST

Patent Literature

Patent Literature 1: JP 2016-107249 A

SUMMARY OF THE INVENTION

Technical Problem

Since the method disclosed in Patent Literature 1 requires the auxiliary ultrapure water production system which has a configuration equivalent to that of the ultrapure water production system for producing ultrapure water to be supplied to a point of use, the equipment scale increases and the cost increases, but the water quality of the raw water supplied to the main ultrapure water production system is not always appropriately evaluated, and as a result, the operation management of the main ultrapure water production system cannot be appropriately performed.

It is an object of the present invention to provide a water treatment management apparatus and a water quality monitoring method which are used for performing operation management of a water treatment system such as an ultrapure water production system, by monitoring and evaluating water supplied to the water treatment system.

Solution to Problem

The water treatment management apparatus according to the present invention is a water treatment management apparatus for use in operation management of a water treatment system, comprising: a pure water production unit for evaluation to which water to be supplied to the water treatment system is supplied as target water, the pure water production unit for evaluation including a TOC removing apparatus for performing a unit operation of removing total organic carbon components; and measuring means for measuring total organic carbon concentration at a plurality of measurement points in the pure water production unit for evaluation, the plurality of measurement points including an inlet and an outlet of the pure water production unit for evaluation.

The water quality monitoring method according to the present invention is a water quality monitoring method for monitoring water quality of target water which is water to be supplied to a water treatment system, the water quality monitoring method comprises: supplying the target water to a pure water production unit for evaluation that is provided separately from the water treatment system and includes a TOC removing apparatus for performing a unit operation for removing total organic carbon components; measuring total organic carbon concentration at a plurality of measurement points in the pure water production unit for evaluation, the plurality of measurement points including an inlet and an outlet of the pure water production unit for evaluation; and analyzing total organic carbon concentration values measured at the plurality of measurement points to evaluate the target water.

According to the present invention, when it is evaluated that an organic substance component, which is difficult to be removed by a reverse osmosis membrane (RO) treatment or an ultraviolet (UV) oxidation treatment employed in the water treatment system, is contained in water supplied to the water treatment system, it becomes possible to perform, for example, control such as not supplying the water to the water treatment system.

Advantageous Effects of Invention

According to the present invention, since water supplied to a water treatment system such as an ultrapure water production system can be evaluated from the measurement result by the measuring means, by controlling the water supply amount and the like, the water treatment system can be operated more stably and the operation management of the water treatment system is facilitated.

DESCRIPTION OF EMBODIMENTS

Next, a preferred embodiment of the present invention will be described with reference to the accompanying drawings.

Figure 1:
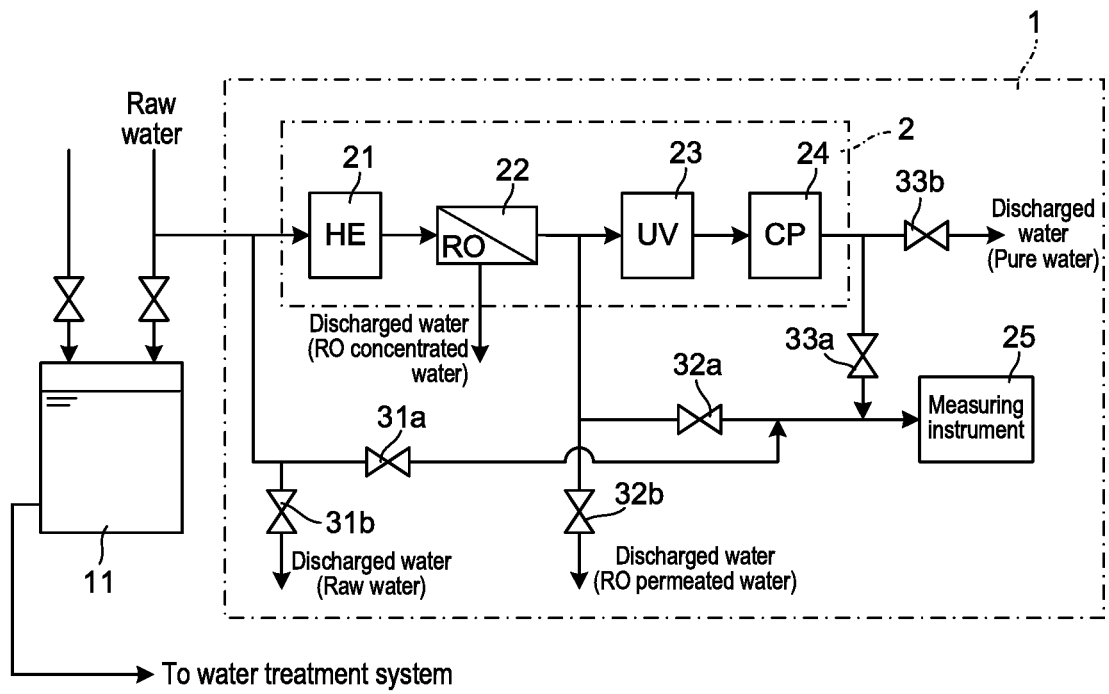
FIG. 1 is a diagram showing a configuration of a water treatment management apparatus according to an embodiment of the present invention.

Assuming that there is a water treatment system such as an ultrapure water production system, water treatment management apparatus 1 of an embodiment of the present invention shown in FIG. 1 is an apparatus used for operation management of the water treatment system. Here, it is assumed that raw water used by the water treatment system is temporarily stored in tank 11 and supplied to the water treatment system. The raw water may be, for example, industrial water or recovered water, but in the following description, water to be supplied to the water treatment system will be broadly referred to as raw water. In the example shown here, water treatment management apparatus 1 is connected to a pipe of the raw water at an inlet side of tank 11, monitors and evaluates the raw water, as target water, to be supplied to the tank 11, for example, confirms the presence of hardly-decomposable TOC components in the raw water, and monitors the concentration and the like of the hardly-decomposable TOC components as necessary. The evaluation results are used, for example, to control supply of the raw water to tank 11. For example, when water is supplied from a plurality of sources to tank 11 and these waters are mixed and supplied to the water treatment system, control of the supply amount of water from at least one source can be performed based on the evaluation results.

Water treatment management apparatus 1 includes: reverse osmosis membrane device (RO) 22 to which the raw water is supplied via heat exchanger (HE) 21; ultraviolet oxidation device (UV) 23; cartridge polisher (CP) 24 connected to an outlet of ultraviolet oxidation device 23; and measuring instrument 25 for measuring TOC concentration. Water that has not permeated through the reverse osmosis membrane in reverse osmosis membrane device 22 is discharged as RO concentrated water, and water that has passed through the reverse osmosis membrane, i.e., RO permeated water, is supplied to ultraviolet oxidation device 23. Cartridge polisher 24 is a non-regenerative type ion exchange device in which an anion exchange resin and a cation exchange resin are filled in a mixed bed. Cartridge polisher 24 is provided for removing ion components in water flowing therethrough and also removing decomposition products generated when organic substances are decomposed by ultraviolet oxidation device 23.

In general, a system comprising a reverse osmosis membrane device to which raw water is supplied, an ultraviolet oxidation device to which permeated water of the reverse osmosis membrane device is supplied, and a cartridge polisher to which water subjected to ultraviolet oxidation treatment in the ultraviolet oxidation device is supplied is used for generating pure water or ultrapure water from the raw water. Therefore, the water treatment management apparatus of the present embodiment is also configured such that a portion from an inlet of reverse osmosis membrane device 22 to an outlet of cartridge polisher 24 is configured as pure water production unit for evaluation 2, and water flowing out of cartridge polisher 24 is pure water. Pure water from cartridge polisher 24 is discharged to the outside via valve 33b. In this pure water production unit for evaluation 2, each of reverse osmosis membrane device 22 and ultraviolet oxidation device 23 is an apparatus for performing a unit operation of removing TOC components in water to be treated.

In order to monitor and evaluate the raw water, this water treatment management apparatus 1 measures TOC concentration at a plurality of locations, i.e., a plurality of measurement points, in pure water production unit for evaluation 2, while the actually generating pure water by pure water production unit for evaluation 2 which is built therein. The measurement points includes at least an inlet and an outlet of pure water production unit for evaluation 2. By contrasting the measurement results of TOC concentration at a plurality of measurement points or obtaining the correlation thereof, or by examining the trend of change in TOC concentration, it is possible to evaluate the water quality of the raw water, particularly the concentration and the behavior of the hardly-decomposable TOC components, and it is possible to control the supply of the raw water to the water treatment system based on the evaluation results. As an example, when TOC concentration at the inlet of pure water production unit for evaluation 2, i.e., TOC concentration of the raw water, is high and TOC concentration at the outlet is not lowered so much as compared with the concentration at the inlet, it can be evaluated that a large amount of the hardly-decomposable TOC components is contained in the raw water.

Measuring instrument 25 is for measuring TOC concentration at a plurality of measurement points in pure water production unit for evaluation 2, the measurement points including at least an inlet and an outlet of pure water production unit for evaluation 2. Specifically, in the configuration shown in FIG. 1, measuring instrument 25 measures TOC concentration of: the raw water to be supplied to reverse osmosis membrane device 22; the outlet water on the permeate side of reverse osmosis membrane device 22, i.e., the RO permeated water; and the outlet water of cartridge polisher 24, i.e., pure water. In water treatment management apparatus 1 shown in FIG. 1, since measuring instrument 25 is provided only one, piping and valves are provided so that water taken at these three measurement points can be supplied to measuring instrument 25 by switching.

In order to monitor and evaluate the water quality of the raw water by water treatment management apparatus 1, it is necessary that pure water production unit for evaluation 2 is stably operated. Therefore, it is necessary to keep the temperature of the raw water supplied to pure water manufacturing unit for evaluation 2 constant by heat exchanger 21 constituting a temperature regulating mechanism, and to maintain flow rate of water through each device for performing the unit operation, i.e. reverse osmosis membrane device 22, ultraviolet oxidation device 23 and cartridge polisher 24, at a constant value determined for each device. In order to keep the temperature constant, a thermometer (not shown) may be provided at the inlet of reverse osmosis membrane device 22 so as to change the supply amount of the heat medium to heat exchanger 21 in response to measurement by the thermometer.

As to the flow rate of water through each device of pure water production unit for evaluation 2, for example, the flow rate of water to reverse osmosis membrane device 22 is set to 550 mL/min, the flow rate of the concentrated water discharged from reverse osmosis membrane device 22 is set to 300 mL/min, and the flow rate of the permeated water is set to 250 mL/min. 100 mL/min of the permeated water having a flow rate of 250 mL/min is used for TOC concentration measurement as described later. The remaining 150 mL/min of the permeated water of 250 mL/min is passed through ultraviolet oxidation device 23 and cartridge polisher 24 connected in series with each other. In the present embodiment, as such water flow rate in each device is maintained, a flow regulating valve which is a flow regulating mechanism is provided as necessary, and valves 31a, 31b, 32a, 32b, 33a, 33b which are opening and closing valves capable of adjusting the opening degree are provided. For example, valve 31a is provided in a pipe for supplying the raw water to the measuring instrument 25, and valve 31b for discharging is provided at the inlet side of valve 31a. Similarly, valves 32a, 32b are provided correspondingly for the outlet of the permeated water of reverse osmosis membrane device 22, and valves 33a, 33b are provided correspondingly for the outlet of cartridge polisher 24. In order to perform more precise flow control, it is preferable to provide a flow meter (not shown) and control the opening degrees of the flow regulating valve and valves 31a, 31b, 32a, 32b, 33a, 33b based on the measurement result of the flow meter.

In this water treatment management apparatus 1, TOC concentration measurement is performed by switching the raw water, the permeated water of reverse osmosis membrane device 22, and the outlet water of cartridge polisher 24. For stable measurement and evaluation, it is important that amounts of the permeated water and the concentrated water in reverse osmosis membrane device 22, and the amounts of water passed through ultraviolet oxidation device 23 and cartridge polisher 24 are kept constant at the time of the switching. Here, the flow rate of water supplied to measuring instrument meter 25 is set to 100 mL/min, and the raw water, the permeated water from reverse osmosis membrane device 22, and the pure water from cartridge polisher 24 are continuously switched to be supplied to measuring instrument 25. In other words, when TOC concentration of the raw water is measured, the raw water is supplied to measuring instrument 25 at a flow rate of 100 mL/min by opening valve 31a connected to the pipe of the raw water. In a period in which TOC concentration of the raw water is not measured, valve 31a is closed. When measuring TOC concentration of the permeated water from reverse osmosis membrane device 22, valve 32a is opened and valve 32b is closed to supply the permeated water of the above flow rate from reverse osmosis membrane device 22 to measuring instrument 25. Incidentally, in a period in which measuring instrument 25 is not measuring TOC concentration of the permeated water, valve 32a is closed to open valve 32b thereby discharging, to the outside, the excess permeated water that has not been sent to measuring instrument 25. When measuring TOC concentration of the pure water from cartridge polisher 24, valve 33a is opened, and the pure water set at the flow rate described above is supplied to measuring instrument 25. In a period in which TOC concentration of the pure water is not measured, valve 33a is closed. Flow control is performed by the valves or the like provided on the pipes so that the flow rate balance between the permeated water and the concentrated water in reverse osmosis membrane device 22 and the flow rate of the water through ultraviolet oxidation device 23 do not change with opening and closing of each of such valves. In water treatment management apparatus 1 of the present embodiment, it is preferable to provide a control unit (not shown) which automatically performs control of the flow regulating valve and valves 31a, 31b, 32a, 32b, 33a, 33b, etc. and records TOC concentration for each measurement point by acquiring the measurement results in measuring instrument 25 in synchronization with the control.

Figure 2:
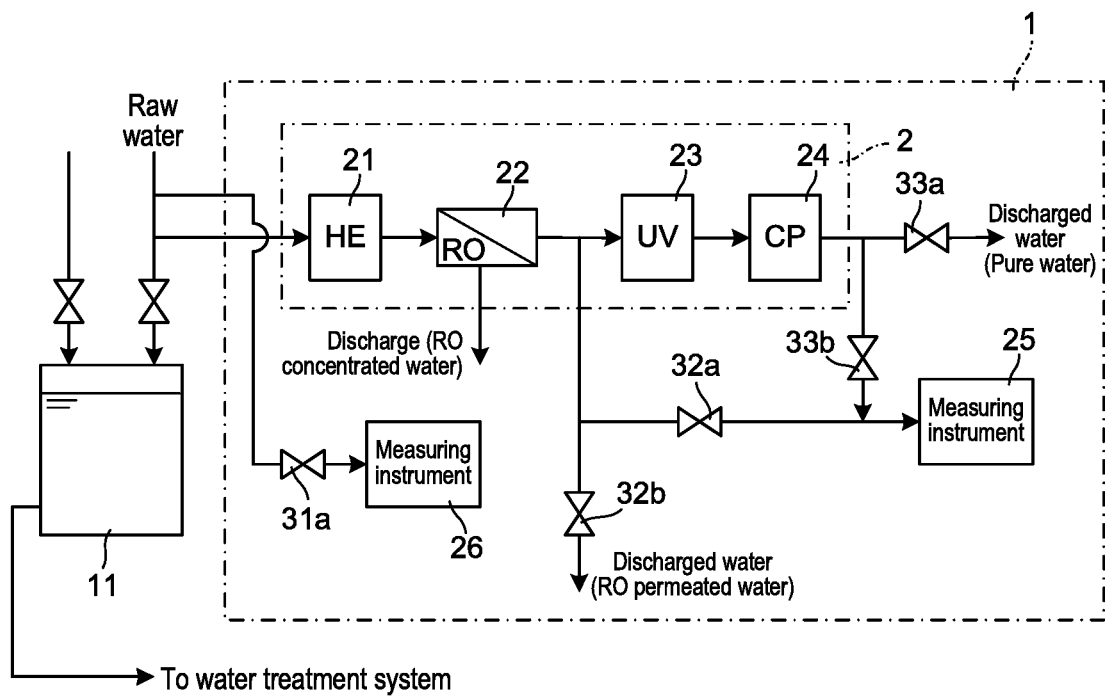
FIG. 2 is a diagram showing a configuration of another water treatment management apparatus.

Water treatment management apparatus 1 shown in FIG. 1 described above uses a single measuring instrument 25 to measure TOC concentration of the raw water, the permeated water from reverse osmosis membrane device 22, and the pure water from cartridge polisher 24. The number of measuring instruments provided in water treatment management apparatus 1 is not limited to one. In water treatment management apparatus 1 shown in FIG. 2, measuring instrument 26 for measuring TOC concentration of the raw water is separately provided, and measuring instrument 26 is connected via valve 31a to the pipe of the raw water. In water treatment management apparatus 1 shown in FIG. 2, measuring instrument 25 measures TOC concentration of the permeated water of reverse osmosis membrane device 22 and the pure water from cartridge polisher 24. Thus when the number of measuring instrument(s) used is smaller than the number of measurement points in water treatment management apparatus 1, it is necessary to provide a plurality of valves on the lines connecting the measuring points and the measuring instrument. Of course, a measuring instrument may be provided for each measurement point of TOC In the above example, pure water production unit for evaluation 2 includes a reverse osmosis membrane device and an ultraviolet oxidation device as apparatuses for performing a unit operation for removing TOC components. However, pure water production unit for evaluation 2 may be provided with only one of a reverse osmosis membrane device and an ultraviolet oxidation device as an apparatus for removing TOC components, or may be provided with another apparatus for removing TOC components. Further, the measurement points of TOC concentration in pure water production unit for evaluation 2 of the water treatment management apparatus is not limited to the above-described points as long as the inlet and outlet of pure water production unit for evaluation 2 are at least included. TOC concentration may be measured only at the inlet and outlet of pure water production unit for evaluation 2, or TOC concentration may be measured at other two or more points in addition to the inlet and outlet.

In each of the above-described embodiments, water treatment management apparatus 1 is used for evaluating the water quality of raw water supplied to the water treatment system and managing the water treatment system based on the evaluation results, for example, for controlling the raw water supply amount to the water treatment system. Therefore, it is desirable that the amount of the raw water supplied to pure water production unit for evaluation 2 in water treatment management apparatus 1 is sufficiently small compared with the amount of the raw water supplied to the water treatment system. As an example, the raw water is supplied to pure water production unit for evaluation 2 at a flow rate of 1/100 or less of the flow rate of the raw water supplied to the water treatment system. Since water treatment management apparatus 1 needs to be able to quickly follow the change in water quality of the raw water, it is preferable that the residence time of pure water production unit for evaluation 2 of water treatment management apparatus 1 is 1 hour or less. From these viewpoints, pure water production unit for evaluation 2 is configured as a small system such that its pure water generation amount is, for example, 1 L/min or less.

Figure 3:
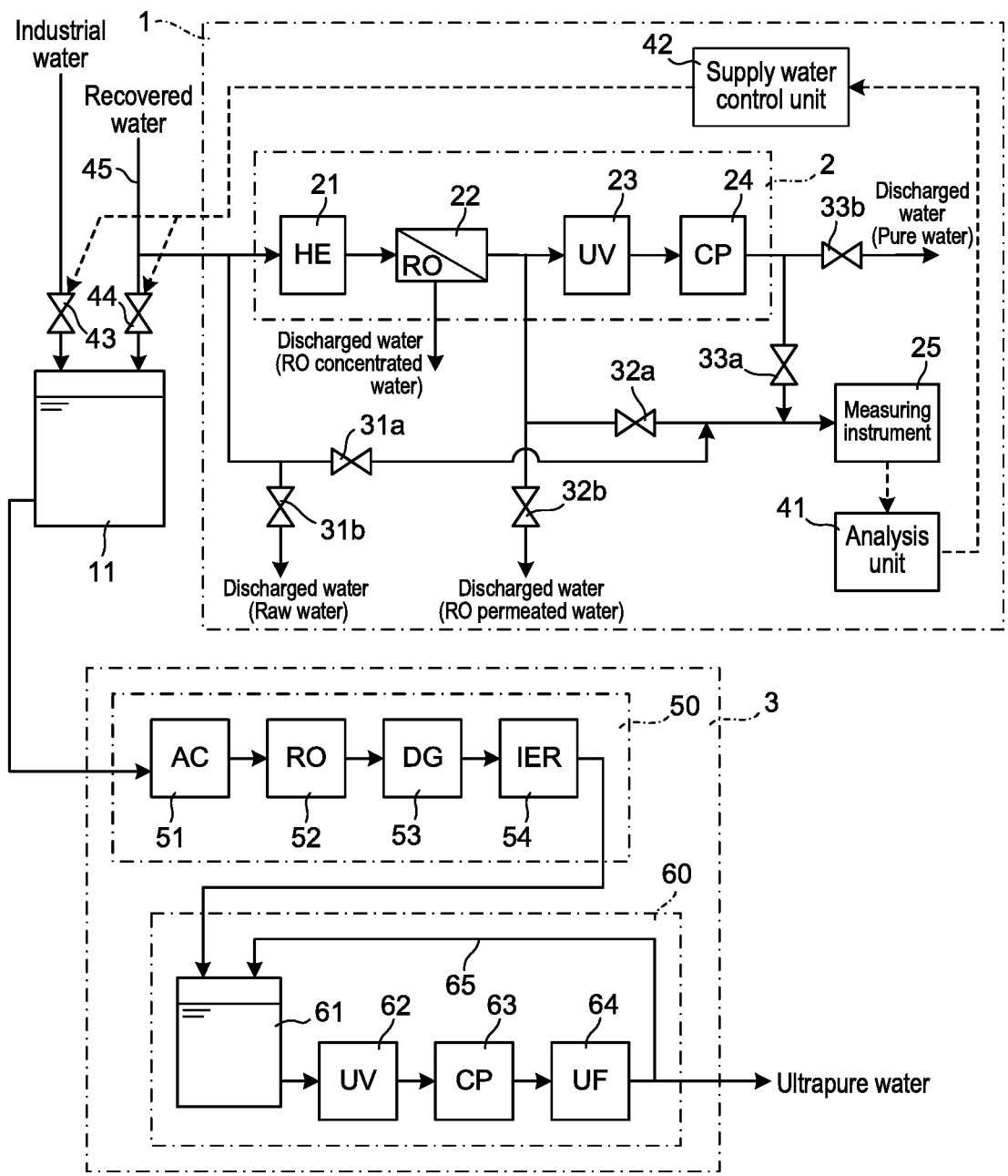
FIG. 3 is a diagram showing a configuration of an embodiment of a water treatment system equipped with the water treatment management apparatus.

Next, a water treatment system equipped with the water treatment management apparatus according to the present invention will be described. FIG. 3 shows a water treatment system equipped with water treatment management apparatus 1, in which the water treatment system shall be an ultrapure water production system.

In the illustrated ultrapure water production system, main portion 3 which actually generates ultrapure water from raw water includes primary pure water system 50 in which the raw water is supplied from raw water tank 11 to generate primary pure water, and secondary pure water system 60 in which the primary pure water generated by primary pure water system 50 is supplied to generate ultrapure water. Water from a plurality of sources is independently supplied to raw water tank 11 so that these waters are mixed in raw water tank 11. In the system shown in FIG. 3, industrial water is supplied to raw water tank 11 through control valve 43, and recovered water is supplied to raw water tank 11 through control valve 44. Although the amount of hardly-decomposable TOC components in industrial water is sufficiently low, it is expected that the concentration of hardly-decomposable TOC components in the recovered water will vary over time, and it is also assumed that the recovered water sometimes contains a large amount of hardly-decomposable TOC components which exceeds the extent accepted by the ultrapure water production system. From the viewpoint of effective utilization of water resources, there is a requirement to use recovered water as much as possible by reducing the amount of industrial water used.

In primary pure water system 50 of the ultrapure water production system, activated carbon device (AC) 51, reverse osmosis membrane device (RO) 52, degassing device (DG) 53, and regeneration type ion exchange device (IER) 54 are connected in series in this order, and the raw water is supplied to activated carbon device 51, and the primary pure water flows out of regeneration type ion exchange device 54. Secondary pure water system 60 includes primary pure water tank 61 for storing primary pure water from primary pure water system 50, and is a system in which ultraviolet oxidation device (UV) 62, cartridge polisher (CP) 63, and ultrafiltration membrane device (UF) 64 are connected in this order to the primary pure water tank 61. Ultrapure water is supplied from ultrafiltration membrane device 64 to a point of use. In secondary pure water system 60, circulation purification may be performed by returning ultrapure water flowing out of ultrafiltration membrane device 64 to primary pure water tank 61 by pipe 65 as shown in the drawing.

Water treatment management apparatus 1 described with reference to FIG. 1 is connected to line 45 of the recovered water flowing into raw water tank 11. Water treatment management apparatus 1 further includes: analysis unit 41 for evaluating water quality of the recovered water by analyzing the measurement results of measuring instrument 25; and a supply water control unit 42 for controlling control valves 43, 44 in accordance with the evaluation results of analysis unit 41. Supply water control unit 42 controls control valves 43,44 so as to increase the supply amount of the industrial water by reducing the supply amount of the recovered water to raw water tank 11 or to stop the supply of only the recovered water, for example, when analysis unit 41 evaluates that concentration of hardly-decomposable TOC components in the recovered water has increased. Thereafter, when concentration of hardly-decomposable TOC components decreases, supply water control unit 42 controls the opening degree of valves 43,44 to be restored.

Water treatment management apparatus 1 is provided with pure water production unit for evaluation 2 comprising reverse osmosis membrane device 22, ultraviolet oxidation device 23, and cartridge polisher 24, As is apparent from the apparatus layout shown in FIG. 3, the water quality of ultrapure water obtained from secondary pure water system 60 is higher than that of pure water obtained from pure water production unit for evaluation 2. In the ultrapure water production system shown in FIG. 3, provided in the water treatment management system is pure water production unit for evaluation 2 which is a small pure water production system and has a non-equivalent configuration to main portion 3 of the ultrapure water production system consisting of primary pure water system 50 and secondary pure water system 60. Since pure water production unit for evaluation 2 monitors water quality of the raw water, it is possible to quickly know the change in water quality of the raw water, and it is possible to prevent the raw water deteriorated in water quality from being supplied to the ultrapure water production system.

Next, evaluation of water quality in analysis unit 41 will be described. In order to evaluate the water quality in analysis unit 41, it is necessary to establish criteria in analysis unit 41 in advance. First, the establishment of the criteria will be described.

In the water treatment management system, TOC concentration of the raw water, the permeated water of reverse osmosis membrane device 22, and the pure water from cartridge polisher 24 is measured by measuring instrument 25. Therefore, TOC concentration of the raw water is set as TOC1, TOC concentration of the permeated water of reverse osmosis membrane device 22 is set as TOC2, and TOC concentration of the pure water from cartridge polisher 24 is set as TOC3. Three types of removal ratio $R_{RO}$, $R_{UV+CP}$, $R_{Total}$ are defined as shown in Equations (1) to (3) below.

$$R_{RO} = 1 - \frac{TOC2}{TOC1}, \qquad (1)$$

$$R_{UV+CP} = 1 - \frac{TOC3}{TOC2}, \quad (2)$$

$$R_{Total} = 1 - \frac{TOC3}{TOC1}. \quad (3)$$

A plurality of types of simulated water containing TOC components are prepared, and at least one of them shall contain a hardly-decomposable TOC component. The hardly-decomposable TOC component is an organic substance which is difficult to be removed by an ultrapure water production system. In the system shown in FIG. 3, an organic substance which is hardly removed by at least one of a reverse osmosis membrane treatment and an ultraviolet oxidation treatment is referred to as the hardly-decomposable TOC component. In particular, the present invention is applied to organic species which are hardly removed by both reverse osmosis membrane treatment and ultraviolet oxidation treatment. Examples of such hardly-decomposable TOC components include urea and the like.

Each of the prepared simulated water is supplied as the raw water to the water treatment management apparatus, TOC concentrations TOC1, TOC2, TOC3 are calculated for the respective simulated waters, and the removal ratios $R_{RO}$, $R_{UV+CP}$, $R_{Total}$ are calculated. Then, criterion for determining that the hardly-decomposable TOC component is contained in the raw water is determined from the difference in the removal ratios between the simulated water containing the hardly-decomposable TOC component and the simulated water without hardly-decomposable TOC component. For example, if removal ratio $R_{RO}$ is 50% or less and removal ratio $R_{UV+CP}$ is 20% or less, it is determined that inflow of a certain amount or more of hardly-decomposable TOC components to the raw water has occurred. When the concentration is low even if the hardly-decomposable TOC component is contained and it is difficult to make determination by using the removal ratio, the determination may be made based on the temporal change of the TOC measurement values.

Once the criteria are established in this way, the criteria are set to analysis unit 41. Thereafter, by introducing the raw water, which is actually supplied to the ultrapure water production system, to raw water tank 11 and monitoring the raw water by water treatment management apparatus 1 before flowing into raw water tank 11, the management of the ultrapure water production system is started. Analysis unit 41 continuously calculates each removal ratio based on the measurement results from measuring instrument 25, and performs determination by applying the criteria to each calculated removal ratio. Then, when it is determined that a certain amount or more of the hardy-decomposable TOC component has entered, analysis unit 41 outputs a signal to supply water control unit 42. Supply water control unit 42, when receiving the signal, for example, performs control to close control valve 44 of the recovered water. Thus, further inflow of the hardy-decomposable TOC components into raw water tank 11 is prevented, and the ultrapure water production system can continuously generate ultrapure water having a predetermined quality.

Although a case has been described here in which analysis unit 41 calculates TOC removal ratio between a plurality of measurement points based on TOC concentration values measured at the measurement points, and evaluates the raw water based on the TOC removal ratio, the evaluation method in analysis unit 41 is not limited thereto. For example, the raw water may be evaluated based on temporal change or a trend of change in at least one of TOC concentration values and TOC removal ratios, based on TOC concentration values measured at a plurality of measurement points.

In the water treatment system shown in FIG. 3, by providing water treatment management apparatus 1 with pure water production unit for evaluation 2 comprising reverse osmosis membrane device 22, ultraviolet oxidation device 23 and cartridge polisher 24, behavior of hardly-decomposable TOC components in the system from raw water tank 11 to ultrafiltration membrane device 64 in the ultrapure water production system is simulated, and the raw water is evaluated. Although the ultrapure water production system is composed of primary pure water system 50 and secondary pure water system 60, secondary pure water system 60 itself is considered as a water treatment system, and the water treatment management apparatus according to the present invention can be used also when evaluating water to be supplied to secondary pure water system 60, for example, the primary pure water from the primary pure water system 50. When an evaluation of water supplied to primary pure water tank 61 is to be performed, it is sufficient that the water to be evaluated is supplied with the water treatment management apparatus, and that an ultraviolet oxidation device and a cartridge polisher are provided in the pure water production unit for evaluation of the water treatment management apparatus, in order to correspond to the configuration of secondary pure water system 60. In other words, in the water treatment management apparatus according to the present invention, it is only necessary to determine the configuration of the pure water production unit for evaluation in the water treatment management apparatus in response to the device configuration of the water treatment system to be managed. As a result of the evaluation, for example, when it is determined that the hardly-decomposable TOC component is contained in the primary pure water from primary pure water system 50 at a certain level or more, it is possible to perform control such as reducing the supply amount of the primary pure water from the corresponding line to primary pure water tank 61, or stopping the supply to increase the supply amount from another back-up line.

EXAMPLES

Next, the present invention will be described in more detail based on Examples and Reference Examples.

Reference Example 1

Figure 4:
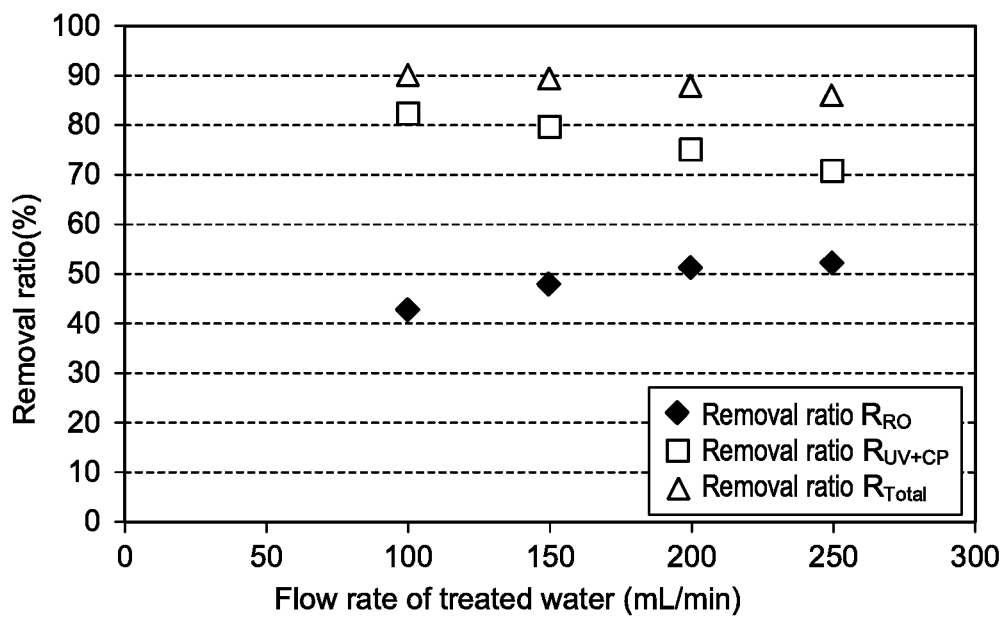
FIG. 4 is a graph illustrating results of Reference Example 1.

Water treatment management apparatus 1 shown in FIG. 1 was assembled, and simulated water obtained by adding isopropyl alcohol (IPA) to pure water to adjust TOC concentration to 100 ppb was prepared and supplied to water treatment management apparatus 1 as the raw water. The operating condition of water treatment management apparatus 1 was changed so that the flow rate of the permeated water of reverse osmosis membrane device 22 was 100 ml/min, 150 ml/min, 200 ml/min, and 250 ml/min, and removal ratio $R_{RO}$ was obtained for each flow rate. Separately, the operation condition of water treatment management apparatus 1 was changed so that the flow rate of the pure water flowing out of cartridge polisher 24, that is, the flow rate of the treated water, was 100 ml/min, 150 ml/min, 200 ml/min, and 250 ml/min, and removal ratio $R_{UV+CP}$ and removal ratio $R_{Total}$ were obtained for each flow rate. FIG. 4 shows the results.

As is apparent from FIG. 4, when the flow rate of the treated water varied, each removal ratio also varied. Therefore, in the water treatment management apparatus according to the present invention, it has been found that it is preferable to keep the flow rate of water in each device in the pure water production unit for evaluation contained therein constant for each device.

Reference Example 2

Water treatment management apparatus 1 shown in FIG. 1 was assembled, water obtained by filtering groundwater was prepared as simulated water, and supplied to water treatment management apparatus 1 as the raw water. The TOC concentration in the simulated water was 270 pp. The opening degree of the valves is adjusted at the initial stage of the water flow to water treatment management apparatus 1, thereafter enabling change of the flow rate without adjusting the opening degree of the valves, changing the temperature of the heat medium flowing through heat exchanger 21 to vary the temperature of the simulated water supplied to pure water manufacturing unit for evaluation 2 in water treatment management apparatus 1. For each temperature of the simulated water, the flow rate and removal ratio $R_{total}$ of the pure water flowing out from cartridge polisher 24, i.e., the treated water, were determined. The results are shown in FIG. 5.

Figure 5:
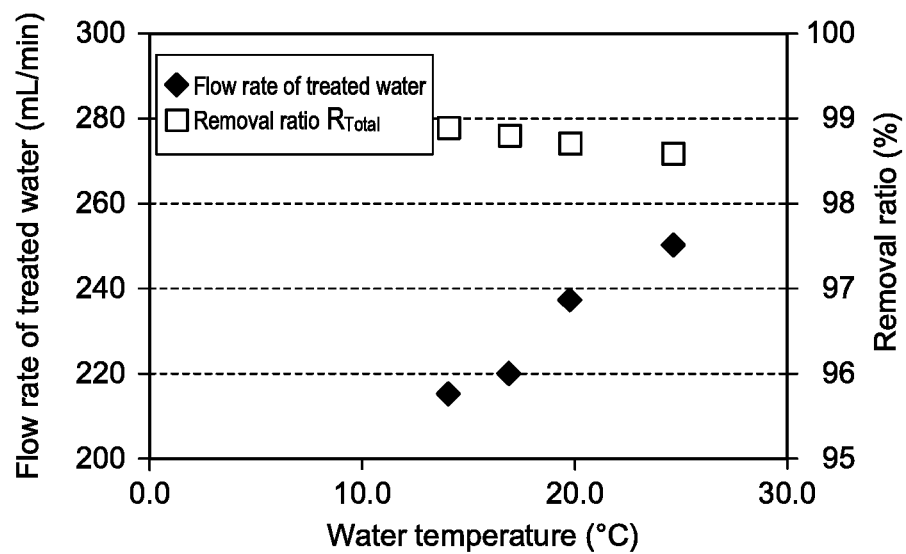
FIG. 5 is a graph illustrating results of Reference Example 2.

As shown in FIG. 5, when the water temperature is low, the flow rate of the treated water flow rate decreases. On the other hand, removal ratio $R_{Total}$ was slightly higher when the water temperature was lower. Thus, even if TOC concentration of the simulated water itself, which is a raw water, is constant, the measured value is also changed due to change of the temperature of the raw water. Therefore, it has been found that it is preferable to keep the temperature of the raw water supplied to the pure water production unit for evaluation constant, in the water treatment management apparatus.

Example 1

Water treatment management apparatus 1 shown in FIG. 1 was assembled to discriminate the hardly-decomposable TOC component and other TOC components. Simulated water 1 to 3 containing isopropyl alcohol, methyl alcohol, and acetone as TOC components, which are not hardly-decomposable TOC components, and simulated water 4 containing urea as a hardly-decomposable TOC component, respectively, were prepared. These simulated water 1 to 4 was supplied to water treatment management apparatus 1 as raw water under a constant temperature condition. The flow rate of water to reverse osmosis membrane device 22 was set to 550 ml/min, the flow rate of concentrated water discharged from reverse osmosis membrane device 22 was set to 300 ml/min, the flow rate of permeated water was set to 250 ml/min. TOC concentration TOC1 of the raw water, TOC concentration TOC2 of the permeate water from reverse osmosis membrane device 22, and TOC concentration TOC3 of the pure water from cartridge polisher 24 were measured, and removal ratios $R_{RO}$, $R_{UV+CP}$, $R_{Total}$ were obtained based on the above Equations (1) to (3). When determining TOC concentration TOC3, the flow rate of water through ultraviolet oxidation device 23 and cartridge polisher 24 connected in series with each other was set to 250 ml/min. The results are given in Table 1.

TABLE 1

|  | TOC1 | $R_{RO}$ | TOC2 | $R_{UV+CP}$ | TOC3 | $R_{Total}$ |
|---|---|---|---|---|---|---|
| Simulated water 1 (Isopropyl alcohol) | 482 ppb | 54% | 222 ppb | 57% | 96 ppb | 80% |
| Simulated water 2 (Methyl alcohol) | 489 ppb | <50% | 483 ppb | 33% | 324 ppb | 34% |
| Simulated water 3 (Acetone) | 505 ppb | <50% | 441 ppb | 57% | 191 ppb | 62% |
| Simulated water 4 (Urea) | 195 ppb | <50% | 176 ppb | <20% | 171 ppb | <20% |

As shown in Table 1, the respective removal ratios vary depending on what the TOC component is. Here, if the criterion of "the hardly-decomposable TOC component is contained in the raw water if removal ratio $R_{RO}$ is 50% or less and removal ratio $R_{UV+CP}$ is 20% or less" is determined in advance, it can be determined that the hardly-decomposable TOC component is contained in the raw water at a certain or more when simulated water 4 containing urea as the hardy-decomposable TOC component is supplied as the raw water to the water treatment management apparatus. The criterion for determining "the hardly-decomposable TOC component is contained in the raw water" can be determined in advance from the TOC concentration values and the values of respective removal ratios at the time that various simulated water is supplied to the water treatment management apparatus.

Here, each of simulated water 1 to 4 contains only a single organic species as a TOC component. However, it is believed that a general raw water that is not simulated water contains multiple organic species as TOC components. In addition, it is considered that the concentration of the hardy-decomposable TOC components in the raw water is not constant and fluctuates over time. Thus it is possible to assume, as an abnormal case, a time when each TOC concentration increases which has been stable until then, in particular when both TOC concentration TOC2 of the permeated water from reverse osmosis membrane device 22 and TOC concentration TOC3 of the pure water from cartridge polisher 24 increase, or when both of removal ratio $R_{RO}$ and removal ratio $R_{UV+CP}$ decrease. When the abnormal case is detected, it can be determined that the concentration of the hardly-decomposable TOC component has increased in a case where the hardy-decomposable TOC component and the TOC component not hardly-decomposable are mixed. When it is determined that the concentration of the hardy-decomposable TOC component has increased, it is possible to perform control so as to reduce the inflow of the recovered water into raw water tank 11, in an ultrapure water production system as shown in FIG. 3, for example.

The specific criterion of how much TOC concentration TOC2, TOC3 became to contain hardly-decomposable TOC components can be determined by testing which uses simulated water in advance. The optimum value of this criterion differs according to the configuration of the water treatment system as well as the quality of the raw water and the TOC specification of the ultrapure water. Here, instead of the TOC concentration value, the TOC residual ratio calculated by subtracting the TOC removal ratio from 1 may be used. For example, it can be judged that, in a case where the TOC concentration value is constant for a certain period of time and then increases, when the increase ratio of the TOC concentration value becomes 20% or more, or when the TOC residual ratio becomes 70% or more, the hardly-decomposable TOC component becomes contained.

REFERENCE SIGNS LIST

1 Water treatment management apparatus;
2 Pure water production unit for evaluation;
3 Main portion of water treatment management system;
11 Raw water tank;
21 Heat exchanger (HE);
22, 52 Reverse osmosis membrane device (RO);
23, 62 Ultraviolet oxidation device (UV);
24, 63 Cartridge polisher (CP);
25, 26 Measuring instrument;
41 Analysis unit;
42 Supply water control unit;
50 Primary pure water system;
51 Activated carbon device (AC);
53 Degassing device (DG);
54 Ion exchange device (IER);
60 Secondary pure water system;
61 Primary pure water tank;
64 Ultrafiltration membrane device (UF).

The invention claimed is:

1. A water treatment apparatus, comprising:
a water treatment system; and
a water treatment management apparatus for use in operation management of the water treatment system, wherein the water treatment management apparatus further comprises:
a pure water production unit for evaluation to which water to be supplied to the water treatment system is supplied as target water, the pure water production unit for evaluation including a Total Organic Carbon (TOC) removing apparatus for performing a unit operation of removing total organic carbon components; and
measuring means for measuring total organic carbon concentration at a plurality of measurement points in the pure water production unit for evaluation, the plurality of measurement points including an inlet and an outlet of the pure water production unit for evaluation,
wherein the pure water production unit for evaluation is non-equivalent to the water treatment system such that water quality of ultrapure water obtained from the water treatment system is higher than water quality of pure water obtained from the pure water production unit for evaluation, and
wherein the pure water production unit for evaluation includes at least a reverse osmosis membrane device, an ultraviolet oxidation device, and a cartridge polisher.

2. The water treatment apparatus according to claim 1, further comprising analysis means that analyzes total organic carbon concentration values measured at the plurality of measurement points to evaluate the target water.

3. The water treatment apparatus according to claim 2, wherein the analysis means calculates a total organic carbon removal ratio between the plurality of measurement points based on the total organic carbon concentration values measured at the plurality of measurement points, and evaluates the target water based on the total organic carbon removal ratio.

4. The water treatment apparatus according to claim 2, wherein the analysis means calculates a total organic carbon removal ratio between the plurality of measurement points based on the total organic carbon concentration values measured at the plurality of measurement points, and evaluates the target water based on a temporal change of at least one of the total organic carbon concentration values and the total organic carbon removal ratio.

5. The water treatment apparatus according to claim 2, wherein the water treatment management apparatus further comprises supply control means that controls supply of the target water to the water treatment system based on an evaluation result by the analysis means.

6. The water treatment apparatus according to claim 1, wherein the pure water production unit for evaluation includes a plurality of the TOC removing apparatus, and the plurality of the TOC removing apparatus are installed in series, and the plurality of the TOC removing apparatus include at least one of the reverse osmosis membrane device and the ultraviolet oxidation device.

7. The water treatment apparatus according to claim 1, wherein the water treatment system is an ultrapure water production system or a pure water production system.

8. The water treatment apparatus according to claim 3, further comprising supply control means that controls supply of the target water to the water treatment system based on an evaluation result by the analysis means.

9. The water treatment apparatus according to claim 4, further comprising supply control means that controls supply of the target water to the water treatment system based on an evaluation result by the analysis means.

10. The water treatment apparatus according to claim 1, wherein the pure water production unit for evaluation further includes a heat exchanger provided upstream from the reverse osmosis membrane device.

11. The water treatment apparatus according to claim 1, wherein the water treatment system includes at least a primary pure water system and a secondary pure water system.

12. The water treatment apparatus according to claim 11, wherein the primary pure water system includes at least an activated carbon device, a reverse osmosis membrane device, a degassing device, and a regenerative type ion exchange device.

13. The water treatment apparatus according to claim 11, wherein the secondary pure water system includes at least an ultraviolet oxidation device, a cartridge polisher, and an ultrafiltration membrane device.

* * * * *